United States Patent
Indyk et al.

(10) Patent No.: US 11,373,207 B1
(45) Date of Patent: Jun. 28, 2022

(54) ADJUSTING CONTENT PRESENTATION BASED ON PARALINGUISTIC INFORMATION

(71) Applicant: INTUIT INC., Mountain View, CA (US)

(72) Inventors: Benjamin Indyk, San Diego, CA (US); Igor A. Podgorny, Mountain View, CA (US); Raymond Chan, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 708 days.

(21) Appl. No.: 15/336,454

(22) Filed: Oct. 27, 2016

(51) Int. Cl.
| | |
|---|---|
| *G06Q 30/02* | (2012.01) |
| *G10L 15/22* | (2006.01) |
| *G10L 15/02* | (2006.01) |
| *G10L 25/87* | (2013.01) |
| *G10L 15/14* | (2006.01) |
| *H04L 67/306* | (2022.01) |

(52) U.S. Cl.
CPC ..... *G06Q 30/0254* (2013.01); *G06Q 30/0272* (2013.01); *G10L 15/02* (2013.01); *G10L 15/14* (2013.01); *G10L 15/22* (2013.01); *G10L 25/87* (2013.01); *H04L 67/306* (2013.01)

(58) Field of Classification Search
CPC .......... G06Q 30/02–077; H04L 67/306; G10L 15/02; G10L 15/14; G10L 15/22; G10L 25/87
See application file for complete search history.

(56) References Cited

U.S. PATENT DOCUMENTS

| | | | | |
|---|---|---|---|---|
| 2001/0032135 | A1* | 10/2001 | Heisler | G06Q 30/02 |
| | | | | 705/14.49 |
| 2004/0044565 | A1* | 3/2004 | Kumar | G06Q 30/02 |
| | | | | 705/14.39 |
| 2004/0236629 | A1* | 11/2004 | Martin | G06Q 30/0212 |
| | | | | 705/14.14 |
| 2008/0004952 | A1* | 1/2008 | Koli | G06Q 30/02 |
| | | | | 705/14.55 |

(Continued)

FOREIGN PATENT DOCUMENTS

WO  WO-2010017647 A1 * 2/2010 ............. G06Q 30/02

OTHER PUBLICATIONS

Trademark Electronic Search System (TESS), AT&T, Nov. 29, 2018, United States Patent and Trademark Office (Year: 2018).*

(Continued)

*Primary Examiner* — Raquel Alvarez
(74) *Attorney, Agent, or Firm* — Patterson & Sheridan, LLP

(57) ABSTRACT

Embodiments disclosed herein select a content message to present to a user on a page of an application based on paralinguistic features of audio input received from the user for the application. The audio input is received via a microphone associated with a computing device. A feature extractor extracts paralinguistic features from the audio input. A predictive model determines a label indicating a measure of receptiveness to product placement (e.g., a predicted marketing outcome) based on the paralinguistic features. A content-selection component selects a content message to present to the user based on the label and based on a profile of the user.

20 Claims, 5 Drawing Sheets

(56) References Cited

U.S. PATENT DOCUMENTS

| | | | | |
|---|---|---|---|---|
| 2008/0059147 | A1* | 3/2008 | Afify | G06Q 30/02 |
| | | | | 704/5 |
| 2011/0055023 | A1* | 3/2011 | McNeeley | G06Q 30/02 |
| | | | | 705/14.72 |
| 2011/0078720 | A1* | 3/2011 | Blanchard | H04N 7/165 |
| | | | | 725/25 |
| 2012/0143693 | A1* | 6/2012 | Chung | G06Q 30/0269 |
| | | | | 705/14.66 |
| 2013/0066740 | A1* | 3/2013 | Ouimet | G06Q 30/06 |
| | | | | 705/26.7 |
| 2013/0138498 | A1* | 5/2013 | Schwartz | G06Q 30/02 |
| | | | | 705/14.35 |
| 2014/0236708 | A1* | 8/2014 | Wolff | G06Q 30/0273 |
| | | | | 705/14.41 |
| 2015/0039448 | A1* | 2/2015 | Byrne | G06Q 30/0275 |
| | | | | 705/14.71 |
| 2018/0041458 | A1* | 2/2018 | Hawkins | G06F 17/241 |

OTHER PUBLICATIONS

Trademark Electronic Search System (TESS), Voicevault, Nov. 29, 2018, United States Patent and Trademark Office (Year: 2018).*

* cited by examiner

ADJUSTING CONTENT PRESENTATION BASED ON PARALINGUISTIC INFORMATION

BACKGROUND

Field

Embodiments presented herein generally relate to systems for targeted content presentation. More specifically, the present disclosure provides techniques for selecting, adapting, and providing content to device users.

Description of the Related Art

In many businesses, product marketing can boost sales, increase profits, and build brand recognition. Often, companies can market more efficiently by advertising to target audiences that include many potential customers. The Internet provides many opportunities for targeted advertising. For example, companies can pay a premium have their websites appear first in results that search engines provide for queries that include certain keywords. Websites can also select content messages to present to site visitors based on information stored in cookies. Such content messages may be shown in pop-up ads, sidebars, header bars, or other locations. Companies can also send content messages to consumers that are on emailing lists.

Some companies also provide trial versions or scaled-down free versions of software for marketing purposes. In general, such companies hope that users will have a good experience with the trial or free version of the software and decide to purchase a full version. In other cases, companies make the full version of the software freely available in a try-before-buy arrangement. In such cases, the software may require customers to pay a fee to use certain functionality (e.g., if the software provides tax preparation services, a fee could be charge for using an electronic filing function). Furthermore, companies often try to "upsell" additional products or services to existing customers. In some circumstances, companies offer special discounts as incentives for potential customers to make a purchase.

However, online advertising can also annoy potential customers. Pop-up ads, for example, can appear at inconvenient times, obstruct a user's view of an application, and even slow down device performance. As a result, some potential customers install blockers to avoid an annoying barrage of unsolicited advertisements. In addition, many customers screen advertising emails with junk filters to keep their inboxes from becoming cluttered. If a customer is repeatedly obliged to see an ad at inconvenient times, the customer may come to view the ad, the product advertised, or the sponsoring company with increasing contempt—even if the customer might have been receptive to the ad under other circumstances (e.g., if the customer had been in a better mood or not been in a hurry, etc.). Keywords, information stored in cookies, and browsing histories do not describe a user's emotional state and do not inform how or where a content message should be presented to a user based on such an emotional state. As a result, even if keywords, cookies, and browsing histories are used to select relevant content to present to a user, the user may reject the content because it is presented at an inconvenient time or in an inconvenient way.

SUMMARY

One embodiment disclosed herein includes a method for providing a targeted content message to a user based on paralinguistic features of audio input. The method generally includes receiving audio input from a user interacting with an application; extracting paralinguistic features from the audio input, wherein the paralinguistic features characterize acoustic aspects of the audio input distinct from verbal content; determining, using a predictive model, a measure of receptiveness to product placement based on the paralinguistic features; upon determining the measure satisfies a condition, selecting a content message to present to the user based on the measure; and transmitting the selected content for presentation to the user.

Another embodiment includes non-transitory computer-readable storage medium containing instructions that, when executed by a processor, perform an operation for providing a targeted content message to a user based on paralinguistic features of audio input. The operation generally includes receiving audio input from a user interacting with an application; extracting paralinguistic features from the audio input, wherein the paralinguistic features characterize acoustic aspects of the audio input distinct from verbal content; determining, using a predictive model, a measure of receptiveness to product placement based on the paralinguistic features; upon determining the measure satisfies a condition, selecting a content message to present to the user based on the measure; and transmitting the selected content for presentation to the user.

Still another embodiment includes a processor and a memory storing one or more applications that, when executed on the processor, perform an operation for providing a targeted content message to a user based on paralinguistic features of audio input. The operation generally includes receiving audio input from a user interacting with an application; extracting paralinguistic features from the audio input, wherein the paralinguistic features characterize acoustic aspects of the audio input distinct from verbal content; determining, using a predictive model, a measure of receptiveness to product placement based on the paralinguistic features; upon determining the measure satisfies a condition, selecting a content message to present to the user based on the measure; and transmitting the selected content for presentation to the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
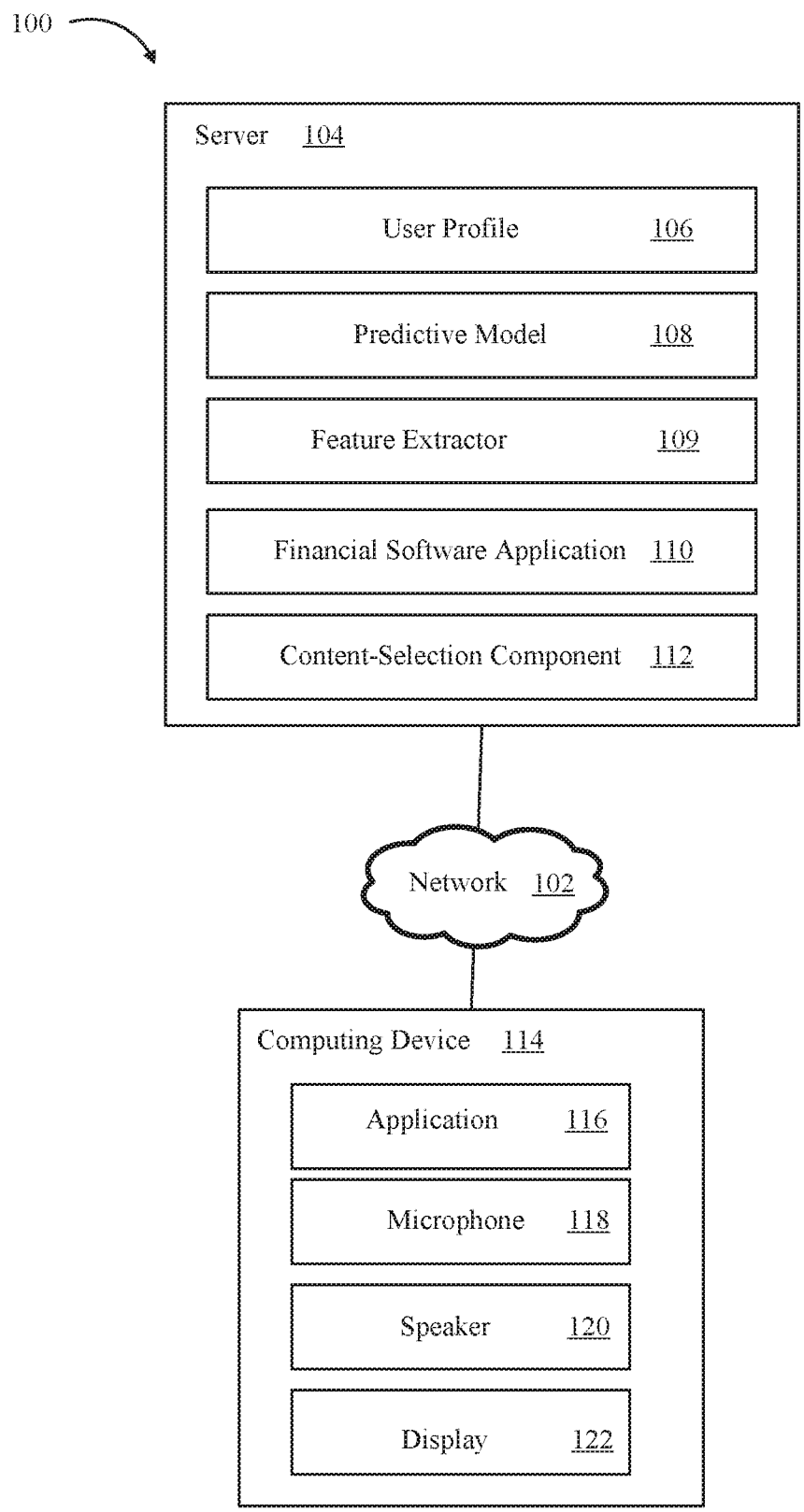
FIG. 1 illustrates a computing environment for predicting a marketing outcome of presenting a content message to a user based on paralinguistic features of audio input, according to one embodiment.

Embodiments presented herein provide techniques to refine what content is selected to be presented to a user. For example, in one embodiment, a user provides audio input for an application by speaking into a microphone. A feature extractor extracts paralinguistic features from the audio input. A predictive model (e.g., a machine-learning model) uses the paralinguistic features to assign a label for the audio input. The label is a measure of receptiveness to product placement, such as a marketing outcome predicted to result if a content message is presented to the user. The label may, for example, indicate an expected profit.

Based on the measure of receptiveness, a content-selection component determines a topic, format, duration, viewing size, and viewing location for a content message to be presented to the user. The content-selection component selects a content message that conforms to the topic, format, and duration. The content message is presented to a user in the viewing location on a display and is scaled to the viewing size. In one embodiment, the content-selection component may also determine an optimal or preferred time for the content message to be presented to the user. For example, the preferred time could defined in terms of a page in the application (e.g., indicating the content should be presented on that page), in terms of an amount of time elapsed since the user commenced using the application, or in terms of a timestamp value (e.g., indicating the content should be presented when at the time indicated by the timestamp value).

In one embodiment, the measure of receptiveness indicates an expected profit. A discount calculator compares the expected profit to a goal amount. If the expected profit exceeds the goal amount, the discount calculator provides a discount offer to the user along with the content message. The discount offer may be for a predefined percentage of the difference between the expected profit and the goal amount.

Note that embodiments of the disclosure are described herein using a financial software application that may determine how and what to present to a user based on paralinguistic information of the user's voice/speech. One of ordinary skill in the art will recognize that the techniques described herein may be adapted for use by a broad variety of software applications, online or web services, software features, or support services where users can use voice/speech to interact with the software. Additionally, it should be noted that although, in certain examples described herein, the one computing device described as performing certain tasks (e.g., capturing audio input, extracting paralinguistic information, speech recognition, action selection, etc.), such tasks may be performed by one or more additional computing devices that the computing device in communication with each other (e.g., via a wired or wireless network), or vice versa. For example, the audio stream, control signals, and information for display may be communicated between the computing devices, such as described with respect to FIG. 1.

FIG. 1 illustrates a computing environment 100 for predicting a marketing outcome of presenting a content message to a user based on paralinguistic features of audio input, according to one embodiment. A server 104 and a computing device 114 are connected to a network 102. The application 116 serves as a front end for the financial software application 110. The financial software application 110 may provide one or more financial services, such as tax preparation or personal financial management.

A user provides audio input to the application 116 via a microphone 118. The audio input may include sounds made by a user, such as words, sighs, laughter, grunts, or breaths. The audio input may also include background noise. The application 116 sends the audio input to the financial software application 110. The financial software application 110 may use voice-recognition software to identify words the user spoke in the audio input. Those words may, for example, be data that the user wishes to provide or commands for the financial software application 110.

In addition, the feature extractor 109 extracts a set of paralinguistic features from the audio input. The paralinguistic features capture information that generally reflects a mood or emotional state. A user in a positive emotional state may be more receptive to a content message than a user in a negative emotional state.

Paralinguistic technically means "alongside linguistics" and therefore deals with phenomena that are modulated onto or embedded into the audio input, including acoustics of the audio input distinct from verbal content (i.e., words used). For example, some of the paralinguistic features may be low level descriptors that are extracted from frames of the audio stream (e.g., 10-30 millisecond frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, dispersion, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the paralinguistic features may include low level descriptors such as phoneme sequences, non-linguistic strings (laughter, sighs, etc.), and/or disfluencies (false starts, filled/unfilled pauses, etc.). The paralinguistic features may also include fundamental frequency, volume, and other measurable characteristics of the audio input. The paralinguistic information may be extracted utilizing software such as EmoVoice, OpenEar, Yaafe, Voice Search DB with Accent and Tone, VoiceVault, AT&T APis, etc.

The predictive model 108 determines a label based on the set of paralinguistic features and, optionally, on additional features included from the user profile 106. The label may be numerical (e.g., a score), categorical, or binary. The label indicates a marketing outcome that is predicted to result if a content message is presented to the user. The term "marketing outcome" may refer to a numerical value (e.g., representing an expected amount of revenue or profit to result from presenting a content message), a binary value (e.g., indicating whether the user is likely to make a purchase or not), or a categorical value (e.g., "cross-sale," "upsale," etc.).

There are many different types of inductive and transductive machine-learning models that can be used for the predictive model. Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAID) methods. These methods may use one or more different metrics to determine the order in which attribute values are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data.

Based on the label and based on the user profile, the content-selection component 112 determines which product or service to advertise to the user and how the content message will be presented. For example, if the label indicates that the user is likely to purchase additional software products from a software vendor that provides the financial software application 110, the content-selection component 112 may select a product or service to advertise the user based on the label and based on attributes in the user profile 106. The user profile 106 may include attributes such as the user's age, income, or spending habits. The content-selection component 112 may also select a location (e.g., on the display 122), a size, a duration, and a presentation format (e.g., video, audio, or some other format) for the content message based on the label and based on attributes in the user profile. The application 116 presents the content message to the user via one or more of the display 122 and the speaker 120.

However, if the label indicates that the user is unlikely to respond positively to a content message, the content-selection component 112 may decline to present any content to the user. This prevents the user from being annoyed by a content message presented at an inconvenient time.

Figure 2:
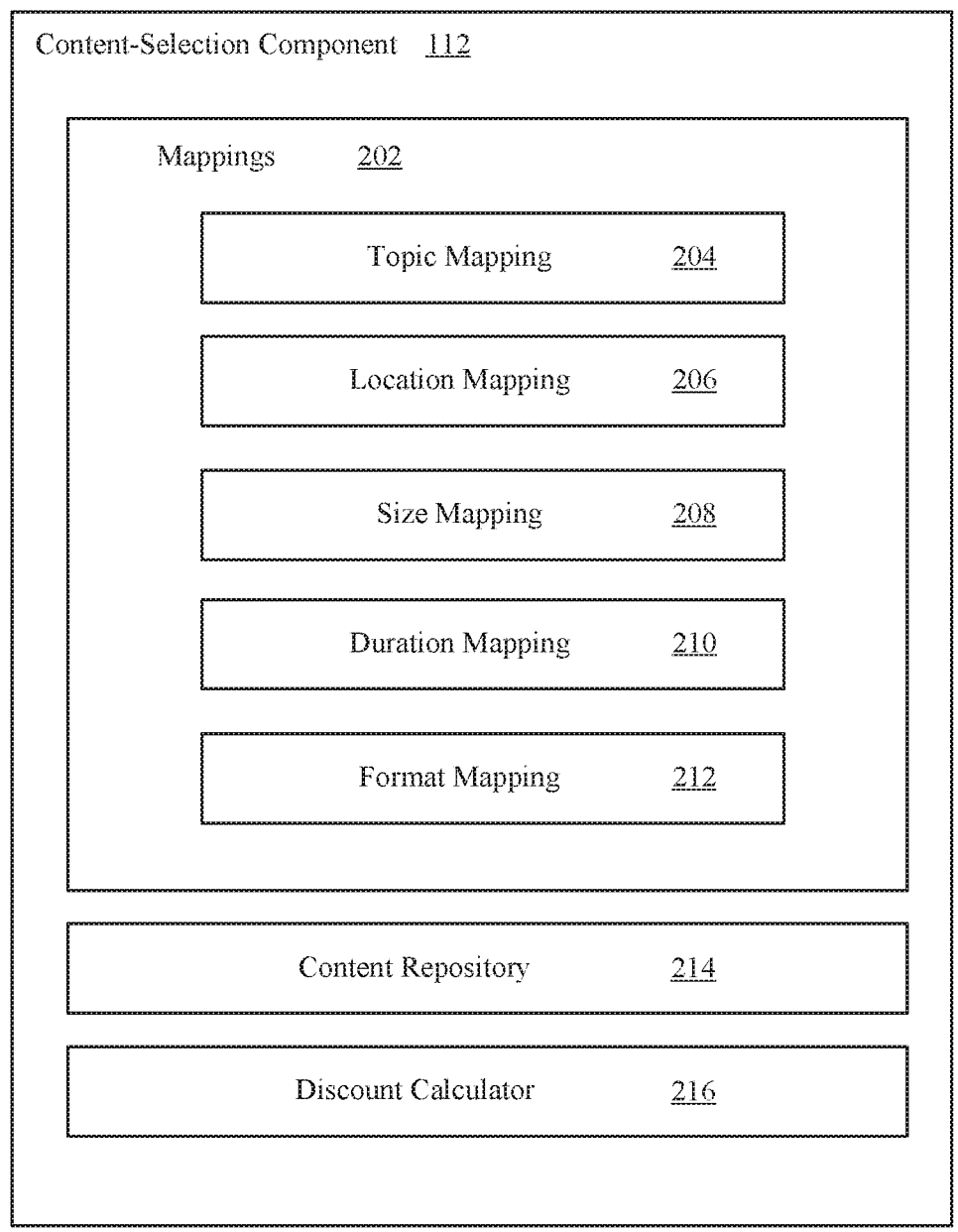
FIG. 2 illustrates a detailed view of a content-selection component, according to one embodiment.

FIG. 2 illustrates a detailed view of the content-selection component 112, according to one embodiment. The content-selection component 112 includes mappings 202. Each of the mappings 202 maps a combination of a label and at least one user attribute value to a parameter that defines what to advertise or how to present what is advertised. For example, the topic mapping 204 maps label/attribute combinations to specific products or services. The content-selection component 112 determines which product or service to advertise to the user by comparing the label (e.g., as determined by the predictive model 108) and user attributes (e.g., found in user profile 106) to the topic mapping 204. The topic mapping 204 may also include default entries that map labels alone to products or services. The default entries can be used when no profile for the user is available.

The location mapping 206 maps label/attribute combinations to screen locations (e.g., for the display 122). A screen location may be defined in several ways. For example, a screen location may indicate an element (e.g., in hypertext markup language (HTML)) where the content message should be placed. A screen location may also specify screen coordinates for a center, edge, or corner of a content message. The screen coordinates may be relative (e.g., corresponding to different pixel coordinates depending on screen resolution). The content-selection component 112 determines where to display a content message by comparing the label (e.g., as determined by the predictive model 108) and user attributes (e.g., found in user profile 106) to the location mapping 206. The location mapping 206 may also include default entries that map labels alone to locations. The default entries can be used when no profile for the user is available.

The size mapping 208 maps label/attribute combinations to sizes. A size may be defined by a single dimension (e.g., total number of pixels used or diagonal distance between corners of a rectangular region) or by multiple dimensions (e.g., width and height). The content-selection component 112 determines how large a content message should be displayed by comparing the label and user attributes to the size mapping 208. The size mapping 208 may also include default entries that map labels alone to sizes. The default entries can be used when no profile for the user is available.

The duration mapping 210 maps label/attribute combinations to time limits. The content-selection component 112 determines a time limit a content message should not exceed by comparing the label and user attributes to the duration mapping 210. The duration mapping 210 may also include default entries that map labels alone to time intervals. The default entries can be used when no profile for the user is available.

The format mapping 212 maps label/attribute combinations to media formats. Some media format types may include video, audio, animated GIF, still image, or text only. The content-selection component 112 determines a media format in which to advertise to the user by comparing the label and user attributes to the format mapping 212. The format mapping 212 may also include default entries that map labels alone to media formats. The default entries can be used when no profile for the user is available.

The content-selection component 112 selects, from the content repository 214, a content message that conforms to the parameters to which the label and user attributes map in the mappings 202. For example, assume the label/attribute combination maps to "ABC software package" in the topic mapping 204, "video" in the format mapping 212, "10 seconds" in the duration mapping 210, "2 inches wide" in the size mapping 208, and "upper left corner of screen" in the location mapping 206. The content-selection component 112 selects a video in the content repository 214. The video advertises the ABC software package and is no more than 10 seconds long. The application 116 will display the video in the upper left corner of the display 122 in an area that is two inches wide.

The content repository 214 may include multiple different ads for each product or service to ensure that at least one available ad conforms to each possible combination of parameter values. For example, the content repository 214 may contain several video ads and audio ads of different durations to ensure the content-selection component 112 can select a video or audio ad that conforms to any duration specified in the duration mapping 210.

The discount calculator 216 can determine a discount to offer to the user along with the content message. For example, if the label indicates an expected profit, the discount calculator 216 can compare the expected profit to a goal amount. If the expected profit exceeds the goal amount, the discount calculator 216 provides a discount offer to the user along with the content message. In one embodiment, the discount offer is for a predefined percentage of the difference between the expected profit and the goal amount.

Figure 3:
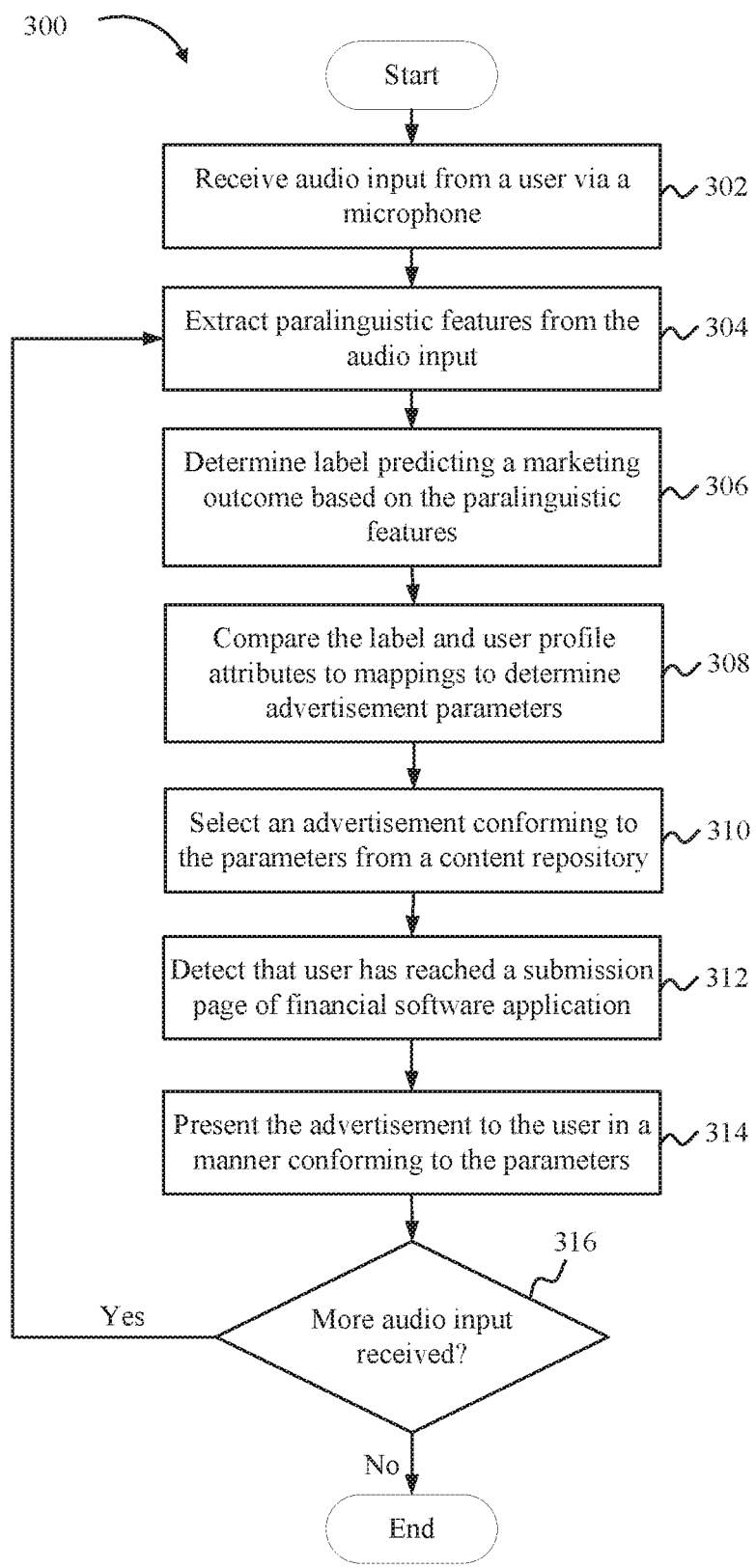
FIG. 3 illustrates a method for providing a targeted content message to a user based on paralinguistic features, according to one embodiment.

FIG. 3 illustrates a method 300 for providing a targeted content message to a user based on paralinguistic features, according to one embodiment. At step 302, a computing device (e.g., mobile device) receives audio input from a user via a microphone. At least some of the audio input includes sounds vocalized or made by the user, such as words, sighs, laughter, grunts, or breaths. The user may provide the audio input while verbally interacting with a financial software application.

At step 304, a feature extractor extracts paralinguistic features from the audio input. At step 306, a predictive model determines a label predicting a marketing outcome based on the paralinguistic features. The predictive model may be a machine-learning model.

At step 308, a content-selection component compares the label and user profile attributes to mappings to determine content-message parameters. The content-message parameters may specify a topic, format, duration, location, and size for an ad to be presented to the user.

At step 310, the content-selection component selects a content message conforming to the parameters (e.g., topic, format, and duration) from a content repository. At step 312, the content-selection component detects that the user has reached a submission page (e.g., a page with a submit button) of the financial software application. At step 314, the financial software application presents the content message to the user in a manner conforming to the parameters (e.g., location and size).

At step 316, the content-selection component determines whether additional audio input has been received. If so, steps 304-314 are repeated with the additional audio input. Otherwise, the method 300 terminates.

Figure 4:
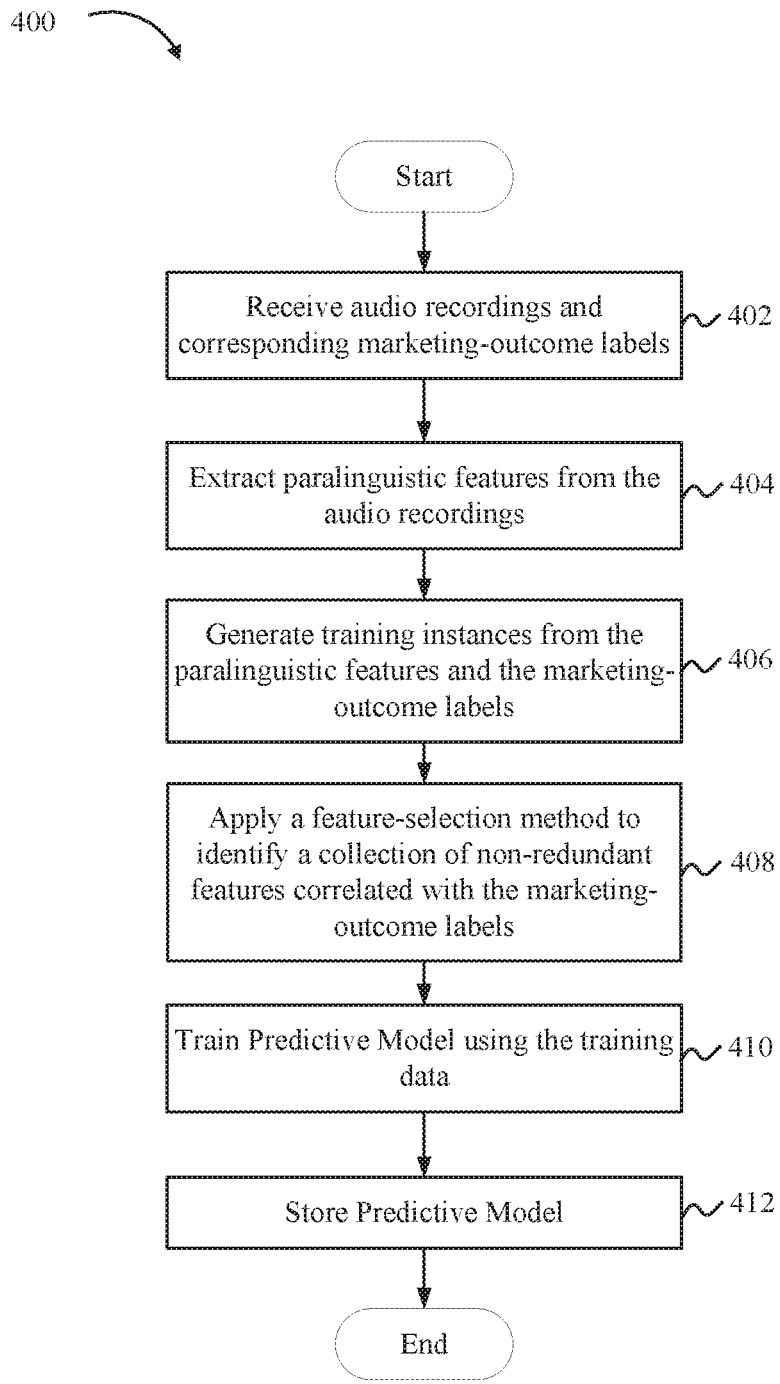
FIG. 4 illustrates a method for training a predictive model to predict a marketing outcome of presenting a content message from paralinguistic features of spoken utterances, according to one embodiment.

FIG. 4 illustrates a method 400 for training a predictive model to predict a marketing outcome of presenting a content message from paralinguistic features of spoken utterances, according to one embodiment. At step 402, a model creator receives audio recordings and corresponding marketing-outcome labels. Each audio recording represents audio input received from a user (including background noise) while the user vocally interacted with a financial software application. The corresponding label for each recording represents the actual marketing outcome that resulted when a content message was presented to the user shortly after the interaction captured by the audio recording took place.

At step 404, the model creator extracts a set of paralinguistic features from each audio recording. At step 406, the model creator generates training instances from the features and the labels. Each training instance comprises the set of features extracted from the corresponding audio recording and the label of the corresponding to the audio recording. The label represents the value (e.g., of the target variable) that the predictive model will be trained to predict based on the set of features.

At step 408, the model creator applies a feature-selection method to identify a collection of non-redundant paralinguistic features that are correlated with the labels. Some feature-selection techniques that the model may apply include the Las Vegas Filter (LVF), Las Vegas Incremental (LVI), Relief, Sequential Forward Generation (SFG), Sequential Backward Generation (SBG), Sequential Floating Forward Search (SFFS), Focus, Branch and Bound (B & B), and Quick Branch and Bound (QB&B) techniques.

There are several reasons why it is useful to identify the collection of non-redundant paralinguistic features correlated with the labels before training the predictive model. For example, some features extracted at step 404 may not be appreciably correlated to the labels that the predictive model is designed to predict. Irrelevant features can cause overfitting some predictive models. In addition, one feature may be so closely correlated with another feature that it would be redundant to use both for training. Furthermore, redundant features can blunt the accuracy of some distance metrics used in instance-based (nearest neighbor) models. Also, when irrelevant or redundant features are present in training data, most predictive models take longer to train.

In general, the number of features included in the collection should be small relative to the total number of training instances in the training data. In some embodiments, the number of features selected for the collection can be at least two orders of magnitude smaller than the number of training instances in the training data.

At step 410, the model creator trains the predictive model to predict the target variable (i.e., the marketing outcome) based on the collection of non-redundant paralinguistic features. The way the training is accomplished depends on which type of machine-learning model used as the predictive model. A neural network, for example, iteratively adjusts weights within layers of network nodes based on an error terms defined by the backpropagation technique. Depending on the learning rate and the number of layers, the neural network may be trained for several hundred epochs (i.e., iterations through the entire set of training data). At step 412, the model creator stores the predictive model for future use. The predictive model is stored in a format that is accessible to a financial software application and a content-selection component.

Figure 5:
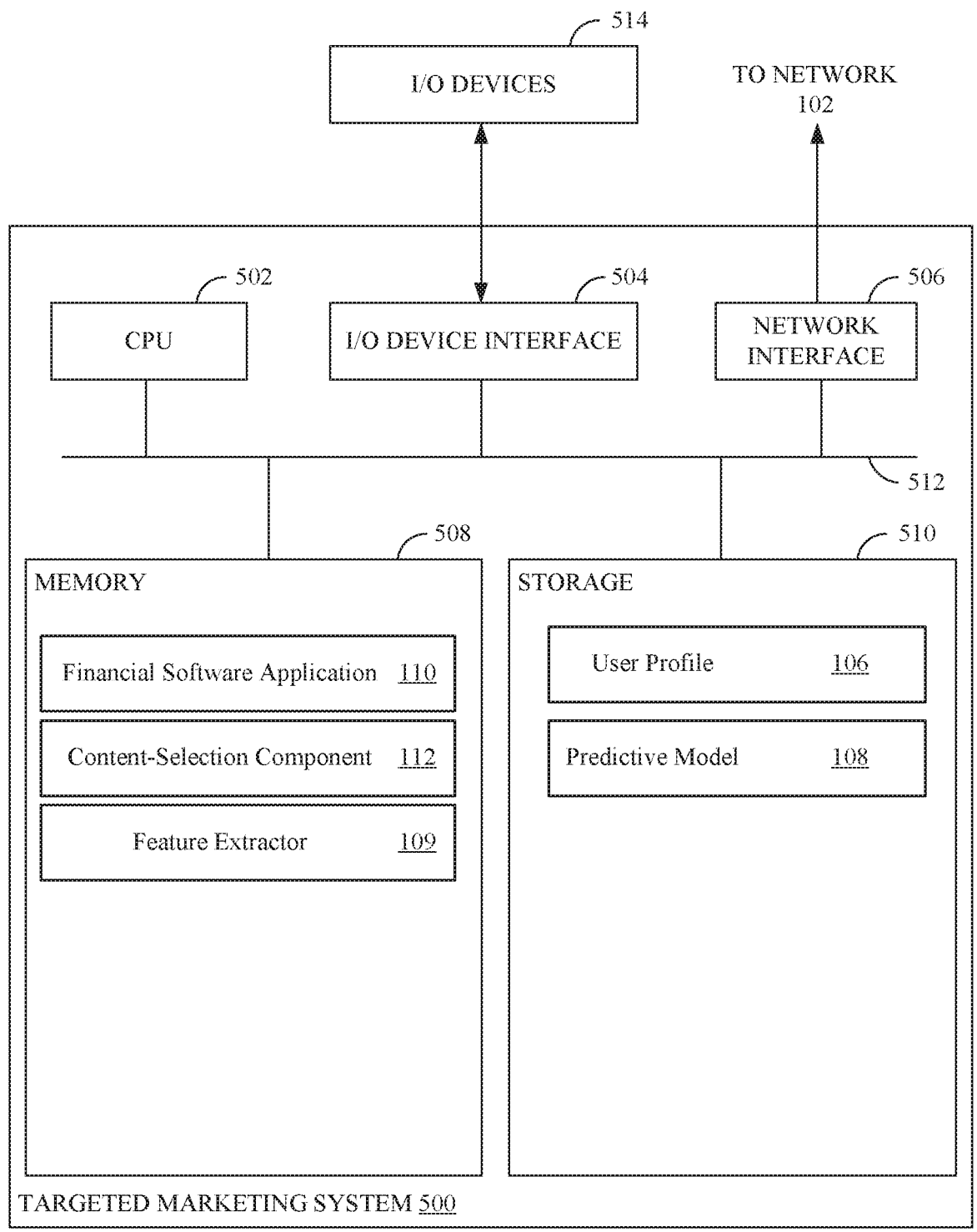
FIG. 5 illustrates a targeted marketing system that provides a targeted content message to a user based on paralinguistic features, according to one embodiment.

FIG. 5 illustrates a targeted marketing system 500 that provides a targeted content message to a user based on paralinguistic features, according to an embodiment. As shown, the targeted marketing system 500 includes, without limitation, a central processing unit (CPU) 502, one or more I/O device interfaces 504 which may allow for the connection of various I/O devices 514 (e.g., keyboards, displays, mouse devices, pen input, etc.) to the targeted marketing system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data among the CPU 502, I/O device interfaces 504, network interface 506, memory 508, and storage 510. CPU 502 can represent a single CPU, multiple CPUs, a single CPU having multiple processing cores, and the like. Additionally, the memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes financial software application 110, content-selection component 112, and feature extractor 109. As shown, storage 510 includes user profile 106 and predictive model 108. The feature extractor 109 extracts paralinguistic features from audio input from a user for the financial software application 110. The predictive model 108 determines a label based on the paralinguistic features. The label represents a predicted marketing outcome of presenting a content message to the user. The content-selection component 112 selects a content message to present to the user based on the label and based on one or more attributes found in the user profile 106.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving audio data from a user interacting with an application via a computing device;
    extracting paralinguistic features from the audio data, wherein the paralinguistic features include information corresponding to an emotional state of the user, wherein the emotional state of the user indicates a likelihood of receptiveness to a content message;
    determining, via a predictive model, a score indicating a predicted outcome of presenting the content message to the user based on the paralinguistic features from the audio data, wherein the predictive model has been trained by a neural network using historical, non-redundant paralinguistic features from audio data that are associated with historical scores;
    retrieving an attribute of the user from a user profile;
    selecting a type of the content message to present to the user based on mapping the score and the attribute of the user to a set of parameters specifying the content message;
    scaling the selected type of content message to a size defined in the set of parameters for presentation to the user via the computing device; and
    presenting the scaled content message to the user in the application via the computing device according to the set of parameters.

2. The method of claim 1, wherein the set of parameters includes a topic parameter indicating a topic for the content message.

3. The method of claim 1, wherein the set of parameters includes a format parameter indicating a media format for the content message.

4. The method of claim 1, wherein the set of parameters includes a duration parameter indicating a time limit for the content message.

5. The method of claim 1, wherein training of the predictive model includes:
    receiving a set of audio recordings and a corresponding score for each audio recording that represents an actual outcome of presenting a content message;
    extracting a set of non-redundant paralinguistic features from each audio recording; and
    identifying the set of non-redundant paralinguistic features from each audio recording that correlates to the corresponding score.

6. The method of claim 1, wherein the set of parameters includes a location parameter indicating a location for presenting the content message in the application.

7. The method of claim 1, wherein the set of parameters includes a set of dimensions indicating the size for scaling the content message.

8. A system, comprising:
    a processor; and
    a memory storing one or more applications, which, when executed on the processor, performs an operation, the operation comprising:
        receiving audio data from a user interacting with an application via a computing device;
        extracting paralinguistic features from the audio data, wherein the paralinguistic features include information corresponding to an emotional state of the user, wherein the emotional state of the user indicates a likelihood of receptiveness to a content message;

determining, via a predictive model, a score indicating a predicted outcome of presenting the content message to the user based on the paralinguistic features from the audio data, wherein the predictive model has been trained by a neural network using historical, non-redundant paralinguistic features from audio data that are associated with historical scores;

retrieving an attribute of the user from a user profile;

selecting a type of the content message to present to the user based on mapping the score and the attribute of the user to a set of parameters specifying the content message;

scaling the selected type of the content message to a size defined in the set of parameters for presentation to the user via the computing device; and presenting the scaled content message to the user in the application via the computing device according to the set of parameters.

9. The system of claim 8, wherein the set of parameters includes a topic parameter indicating a topic for the content message.

10. The system of claim 8, wherein the set of parameters includes a format parameter indicating a media format for the content message.

11. The system of claim 8, wherein the set of parameters includes a duration parameter indicating a time limit for the content message.

12. The system of claim 8, wherein training of the predictive model includes:
receiving a set of audio recordings and a corresponding score for each audio recording that represents an actual outcome of presenting a content message;
extracting a set of non-redundant paralinguistic features from each audio recording; and
identifying the set of non-redundant paralinguistic features from each audio recording that correlates to the corresponding score.

13. The system of claim 8, wherein the set of parameters includes a location parameter indicating a location for presenting the content message in the application.

14. The system of claim 8, wherein the set of parameters includes a set of dimensions indicating the size for scaling the content message.

15. A non-transitory computer-readable storage medium containing instructions that, when executed by one or more processors, cause the one or more processors to perform an operation, the operation comprising:
receiving audio data from a user interacting with an application via a computing device;
extracting paralinguistic features from the audio data, wherein the paralinguistic features include information corresponding to an emotional state of the user, wherein the emotional state of the user indicates a likelihood of receptiveness to a content message;
determining, via a predictive model, a score indicating a predicted outcome of presenting the content message to the user based on the paralinguistic features from the audio data, wherein the predictive model has been trained by a neural network using historical, non-redundant paralinguistic features from audio data that are associated with historical scores;
retrieving an attribute of the user from a user profile;
selecting a type of the content message to present to the user based mapping the score and the attribute of the user to a set of parameters specifying the content message;
scaling the selected type of the content message to a size defined in the set of parameters for presentation to the user via the computing device; and
presenting the scaled content message to the user in the application via the computing device according to the set of parameters.

16. The non-transitory computer-readable storage medium of claim 15, wherein the set of parameters includes a topic parameter indicating a topic for the content message.

17. The non-transitory computer-readable storage medium of claim 15, wherein the set of parameters includes a format parameter indicating a media format for the content message.

18. The non-transitory computer-readable storage medium of claim 15, wherein the set of parameters includes a duration parameter indicating a time limit for the content message.

19. The non-transitory computer-readable storage medium of claim 15, wherein training of the predictive model includes:
receiving a set of audio recordings and a corresponding score for each audio recording that represents an actual outcome of presenting a content message;
extracting a set of non-redundant paralinguistic features from each audio recording; and
identifying the set of non-redundant paralinguistic features from each audio recording that correlates to the corresponding score.

20. The non-transitory computer-readable storage medium of claim 15, wherein the set of parameters includes a location parameter indicating a location for presenting the content message in the application.

\* \* \* \* \*